US010678820B2

(12) United States Patent
Browarnik

(10) Patent No.: US 10,678,820 B2
(45) Date of Patent: Jun. 9, 2020

(54) SYSTEM AND METHOD FOR COMPUTERIZED SEMANTIC INDEXING AND SEARCHING

(71) Applicant: Abel Browarnik, Jerusalem (IL)

(72) Inventor: Abel Browarnik, Jerusalem (IL)

(73) Assignee: Abel Browarnik, Jerusalem (IL)

( * ) Notice: Subject to any disclaimer, the term of this patent is extended or adjusted under 35 U.S.C. 154(b) by 0 days.

(21) Appl. No.: 16/381,024

(22) Filed: Apr. 11, 2019

(65) Prior Publication Data

US 2019/0317953 A1    Oct. 17, 2019

(30) Foreign Application Priority Data

Apr. 12, 2018    (IL) .......................................... 258689

(51) Int. Cl.
*G06F 16/31*        (2019.01)
*G06F 16/338*       (2019.01)
*G06F 16/332*       (2019.01)
*G06F 40/30*        (2020.01)
*G06F 40/211*       (2020.01)
*G06F 40/247*       (2020.01)
*G06F 40/35*        (2020.01)
(Continued)

(52) U.S. Cl.
CPC .......... *G06F 16/328* (2019.01); *G06F 16/338* (2019.01); *G06F 16/3326* (2019.01); *G06F 40/211* (2020.01); *G06F 40/247* (2020.01); *G06F 40/268* (2020.01); *G06F 40/284* (2020.01); *G06F 40/289* (2020.01); *G06F 40/30* (2020.01); *G06F 40/35* (2020.01)

(58) Field of Classification Search
CPC ...... G06F 40/20; G06F 40/205; G06F 40/211; G06F 40/268; G06F 40/284; G06F 40/289; G06F 40/30; G06F 40/35
See application file for complete search history.

(56) References Cited

U.S. PATENT DOCUMENTS 4,868,733 A    9/1989    Fujisawa
5,995,920 A *  11/1999   Carbonell ............. G06F 40/253
                                                          704/9
(Continued)

FOREIGN PATENT DOCUMENTS

CN    104281693    1/2015
CN    106716408    5/2017
(Continued)

OTHER PUBLICATIONS

"FrameNet" from: https://en.wikipedia.org/wiki/FrameNet (taken on Jun. 4, 2019).

*Primary Examiner* — Eric Yen
(74) *Attorney, Agent, or Firm* — S.J. Intellectual Property Ltd

(57) ABSTRACT

A semantic indexing system, the semantic indexing system comprising a processing resource configured to: provide a corpus comprising a plurality of textual documents, wherein (a) each of the textual documents being composed of one or more sentences; (b) each of the sentences being composed of one or more statements; and generate an index, the index mapping each of the statements to one or more frames; wherein each frame defines a structure that carries a semantic meaning, thereby enabling searching the corpus by the semantic meaning of a search statement.

20 Claims, 4 Drawing Sheets

(51) Int. Cl.
*G06F 40/289* (2020.01)
*G06F 40/268* (2020.01)
*G06F 40/284* (2020.01)

(56) References Cited

U.S. PATENT DOCUMENTS

| | | | |
|---|---|---|---|
| 6,076,051 A * | 6/2000 | Messerly | G06F 40/30 |
| | | | 704/9 |
| 6,243,670 B1 * | 6/2001 | Bessho | G06F 40/30 |
| | | | 704/9 |
| 8,112,436 B2 | 2/2012 | Lu | |
| 8,229,944 B2 | 7/2012 | Latzina | |
| 8,301,633 B2 | 10/2012 | Cheslow | |
| 8,335,778 B2 | 12/2012 | Ghosh | |
| 8,386,485 B2 | 2/2013 | Kerschberg | |
| 8,392,436 B2 | 3/2013 | Bai | |
| 8,498,983 B1 | 7/2013 | Zhang | |
| 8,719,248 B2 | 5/2014 | Mukhopadhyay | |
| 8,762,384 B2 | 6/2014 | Heidasch | |
| 8,788,525 B2 | 7/2014 | Neels | |
| 8,949,263 B1 * | 2/2015 | Rosner | G06F 16/35 |
| | | | 707/758 |
| 8,972,440 B2 | 3/2015 | Boguraev | |
| 9,223,777 B2 | 12/2015 | Heidasch | |
| 9,268,767 B2 | 2/2016 | Kim | |
| 9,292,490 B2 * | 3/2016 | Kimelfeld | G06F 40/289 |
| 9,589,050 B2 | 3/2017 | Tao | |
| 9,684,683 B2 | 6/2017 | Dang | |
| 9,684,717 B2 | 6/2017 | Pfitzner | |
| 9,690,861 B2 | 6/2017 | Boloor | |
| 9,710,518 B2 | 6/2017 | Cheng | |
| 9,710,547 B2 | 7/2017 | Maňá | |
| 9,760,657 B2 | 9/2017 | Masiero | |
| 9,779,182 B2 | 10/2017 | Novosel | |
| 2004/0098250 A1 | 5/2004 | Kimchi | |
| 2008/0221878 A1 * | 9/2008 | Collobert | G06F 40/30 |
| | | | 704/232 |
| 2009/0012842 A1 * | 1/2009 | Srinivasan | G06F 16/3344 |
| | | | 705/12 |
| 2009/0063473 A1 * | 3/2009 | Van Den Berg | G06F 40/30 |
| 2009/0076839 A1 | 3/2009 | Abraham-Fuchs | |
| 2009/0089277 A1 | 4/2009 | Cheslow | |
| 2009/0119286 A1 | 5/2009 | Reisman | |
| 2009/0204605 A1 | 8/2009 | Bai | |
| 2010/0070517 A1 | 3/2010 | Ghosh | |
| 2011/0029514 A1 | 2/2011 | Kerschberg | |
| 2011/0072021 A1 | 3/2011 | Lu | |
| 2011/0264697 A1 | 10/2011 | Latzina | |
| 2011/0314032 A1 | 12/2011 | Bennett | |
| 2012/0246153 A1 | 9/2012 | Pehle | |
| 2012/0303600 A1 | 11/2012 | Mukhopadhyay | |
| 2012/0310990 A1 | 12/2012 | Viegas | |
| 2013/0290370 A1 | 10/2013 | Boguraev | |
| 2013/0339340 A1 | 12/2013 | Pfitzner | |
| 2014/0040275 A1 | 2/2014 | Dang | |
| 2014/0046876 A1 * | 2/2014 | Zhang | G06F 16/337 |
| | | | 706/11 |
| 2014/0074887 A1 | 3/2014 | Neels | |
| 2014/0114649 A1 * | 4/2014 | Zuev | G06F 16/3344 |
| | | | 704/9 |
| 2014/0156264 A1 * | 6/2014 | Etzioni | G06F 40/211 |
| | | | 704/9 |
| 2014/0258322 A1 | 9/2014 | Kim | |
| 2014/0324808 A1 | 10/2014 | Sandhu | |
| 2014/0365481 A1 | 12/2014 | Novosel | |
| 2015/0039581 A1 | 2/2015 | John | |
| 2015/0051900 A1 | 2/2015 | Kimelfeld | |
| 2015/0058315 A1 | 2/2015 | Heidasch | |
| 2015/0095319 A1 | 4/2015 | Ormont | |
| 2015/0278195 A1 * | 10/2015 | Yang | G06F 40/30 |
| | | | 704/9 |
| 2015/0286708 A1 | 10/2015 | Tao | |
| 2015/0324431 A1 | 11/2015 | Cheng | |
| 2015/0331850 A1 * | 11/2015 | Ramish | G06F 16/245 |
| | | | 704/9 |
| 2016/0019299 A1 | 1/2016 | Boloor | |
| 2016/0078349 A1 * | 3/2016 | Byron | G06F 40/30 |
| | | | 706/12 |
| 2016/0085853 A1 | 3/2016 | Zelevinsky | |
| 2016/0125462 A1 | 5/2016 | Mallah | |
| 2016/0147878 A1 | 5/2016 | Maňá | |
| 2016/0171050 A1 | 6/2016 | Das | |
| 2016/0217142 A1 | 7/2016 | Ye | |
| 2016/0217207 A1 | 7/2016 | Okura | |
| 2016/0246779 A1 * | 8/2016 | Ho | G06F 40/30 |
| 2016/0246840 A1 | 8/2016 | Masiero | |
| 2016/0357851 A1 | 12/2016 | Perkins | |
| 2016/0371263 A1 | 12/2016 | Carus | |
| 2017/0109435 A1 | 4/2017 | Li | |
| 2017/0177729 A1 | 6/2017 | Duke | |
| 2017/0212899 A1 | 7/2017 | Lightner | |
| 2017/0242934 A1 | 8/2017 | Bullotta | |

FOREIGN PATENT DOCUMENTS

| | | |
|---|---|---|
| EP | 0638870 | 2/1955 |
| HK | 1173817 | 5/2013 |
| HK | 1178277 | 9/2013 |
| KR | 20160064826 | 6/2016 |
| WO | WO2006086179 | 8/2006 |
| WO | WO2010067142 | 6/2010 |
| WO | WO2010141398 | 12/2010 |
| WO | WO2013022574 | 2/2013 |
| WO | WO2014128736 | 8/2014 |
| WO | WO2016142846 | 9/2016 |
| WO | WO2017112650 | 6/2017 |
| WO | WO2017173104 | 10/2017 |

* cited by examiner

SYSTEM AND METHOD FOR COMPUTERIZED SEMANTIC INDEXING AND SEARCHING

TECHNICAL FIELD

The invention relates to computerized semantic indexing and searching, and more specifically to semantically indexing a corpus of documents and searching for documents within the corpus using the semantic index.

BACKGROUND

Computerized search engines can be divided into two main categories: (1) keyword search engines that perform the search by matching keywords to text comprised within texts of textual objects within a corpus of textual objects, and (2) semantic search engines that perform the search in accordance with a semantic meaning of a search phrase provided by a user, trying to "understand" what the user is searching for.

In many cases, current computerized search engines provide a large set of results, which in many cases is unfocused, and miss out on the results that the user desires to obtain. This is true for both keyword search engines and for semantic search engines. In semantic search engines, sentences, or parts thereof, are mapped to corresponding patterns in an attempt to "understand" their meaning. In existing semantic search engines, on top of existing problems of multiple semantic meanings to various sentences, or parts of sentences, the number of patterns to which sentences, or parts thereof, are mapped is very large and cannot be pre-determined. Therefore, there is a need in the art for a new method and system for semantic indexing and searching.

References considered to be relevant as background to the presently disclosed subject matter are listed below. Acknowledgement of the references herein is not to be inferred as meaning that these are in any way relevant to the patentability of the presently disclosed subject matter.

US Patent Application No. 2016/0085853 (Zelevinsky et al.) published on Mar. 24, 2016 discloses a system for performing semantic search receives an electronic text corpus and separates the text corpus into a plurality of sentences. The system parses and converts each sentence into a sentence tree. The system receives a search query and matches the search query with one or more of the sentence trees.

US Patent Application No. 2016/0147878 (Mana) published on May 26, 2016 discloses a Semantic Search Engine using Lexical Functions and Meaning-Text Criteria, that outputs a response (R) as the result of a semantic matching process consisting in comparing a natural language query (Q) with a plurality of contents (C), formed of phrases or expressions obtained from a contents' database (6), and selecting the response (R) as being the contents corresponding to the comparison having a best semantic matching degree. It involves the transformation of the contents (C) and the query in individual words or groups of tokenized words (W1, W2), which are transformed in its turn into semantic representations (LSC1, LSC2) thereof, by applying the rules of Meaning Text Theory and through Lexical Functions, the said semantic representations (LSC1, LSC2) consisting each of a couple formed of a lemma (L) plus a semantic category (SC).

U.S. Pat. No. 4,868,733 (Fujisawa et al.) published on Sep. 19, 1989 discloses a document filing system for storing a large amount of information in proper arrangement for facilitating utilization thereof by a user, while allowing semantical retrieval to be realized even from vague fragmental information. Further, a method is provided for expressing the facts constituting information in terms of "concepts" representing things and "relations" defined between the concepts internally of computer, and a method of inputting user's information to a computer through dialogical procedure and retrieving desired information. Information stored of the computer architects internally a concept network which is displayed in various forms such as hierarchical form based on subsumption relations between the concepts, hierarchical representation based on part-whole relation between the concept, a frame display of a single concepts, and tabular representation of a set of concepts belonging to a given class. The network may be browsed by referring to the contents of the display so that a user can easily know what kind of information has been stored internally of the computer, whereby he or she can perform inputting of new information and retrieval of desired information in a facilitated and simplified manner. The relations stored internally of the computer are classified into "generic relationship" and "instance relation" representing individual facts, whereby a generic framework of facts can be stored. The generic framework is displayed upon interaction with the user for allowing new information to be inputted and desired information to be retrieved in a facilitated and simplified manner. Retrieval by using sematic retrieval formula created internally through dialogical procedure is realized through inferring processing.

GENERAL DESCRIPTION

In accordance with a first aspect of the presently disclosed subject matter, there is provided a semantic indexing system, the semantic indexing system comprising a processing resource configured to: provide a corpus comprising a plurality of textual documents, wherein (a) each of the textual documents being composed of one or more sentences; (b) each of the sentences being composed of one or more statements; and generate an index, the index mapping each of the statements to one or more frames; wherein each frame defines a structure that carries a semantic meaning, thereby enabling searching the corpus by the semantic meaning of a search statement.

In some cases, the processing resource is further configured to: receive a given search statement; map at least one of: (a) the given search statement, and (b) one or more derivatives thereof, to one or more of the frames, giving rise to search frames; and generate, using the index, a list of one or more of the textual documents comprising one or more of the statement that are mapped to at least one of the search frames.

In some cases, the given search statement is provided by a user and wherein the processing resource is further configured to provide the list to the user.

In some cases, the processing resource is further configured to: receive, from the user, information enabling identification of suspected incompatibilities between suspected incompatible statements of the statement within the textual documents within the list and the search statement; and perform one or more suspected incompatibilities resolution measures to resolve the incompatibilities.

In some cases, the suspected incompatibilities resolution measures include: providing a second user with the information enabling identification of the suspected incompatibilities; receiving, from the second user, a suspected incompatibilities resolution instruction for updating the index; updating the index in accordance with the suspected incompatibilities resolution instruction received from the second user.

In some cases, the suspected incompatibilities resolution measures includes automatically removing the mapping between the incompatible statements and the search frames.

In some cases, the search statement is part of a search sentence.

In some cases, the derivatives are determined by replacing one or more words of the given search statement with semantically-related replacement words.

In some cases, the semantically-related replacement words include synonyms, antonyms, hypernym, Hyponym, meronym, holonym, or troponym.

In some cases, the semantically-related replacement words are identified using WordNet.

In some cases, the frame is a pattern consisting of a syntactic description and one or more semantic predicates with a temporal function.

In some cases, mapping of the statement to the frames is performed using a verb of the statement and using VerbNet.

In some cases, the frame represents a situation involving one or more participants, one or more props, and one or more conceptual roles.

In some cases, mapping of the statements to the frames is performed using a verb of the statement and using FrameNet.

In some cases, the textual documents are of one or more of the following file types: (a) Portable Document Format (PDF); (b) Extensible Markup Language (XML); (c) Microsoft (MS) Word; and (d) Hypertext Markup Language (HTML).

In some cases, the processing resource is further configured to perform the following for each given statement of the statements, being mappable to a plurality of frames identified by a given mapping scheme: calculate a compatibility score indicative of the compatibility of each of the frames to the given statement; and select one or more of the frames, utilizing the compatibility score, giving rise to the frames that the given statement is mapped to.

In some cases, the compatibility score is determined by a correlation between statement elements of the given statement and frame elements of the frame.

In some cases, the statement elements and the frame elements are associated with respective element types and wherein the correlation weighted in accordance with a weight given to each of the element types.

In some cases, the mapping scheme is based on at least one of (a) VerbNet and (b) FrameNet.

In some cases, the index is language-agnostic, as a semantically-identical statement in a first language and in a second language will be mapped to a given frame of the frames.

In accordance with a second aspect of the presently disclosed subject matter, there is provided a semantic searching system, the semantic searching system comprising a processing resource configured to: provide an index, the index mapping a plurality of statements to one or more frames, wherein each frame defines a structure that carries a semantic meaning, thereby enabling searching the corpus by the semantic meaning of a search statement; receive a given search statement; map at least one of: (a) the given search statement, and (b) one or more derivatives thereof, to one or more of the frames, giving rise search frames; and generate, using the index, a list of one or more textual documents comprising one or more of the statements that are mapped by the index to at least one of the search frames.

In some cases, the given search statement is provided by a user and wherein the processing resource is further configured to provide the list to the user.

In some cases, the processing resource is further configured to: receive, from the user, information enabling identification of incompatible statements of the statements within the textual documents within the list as being incompatible with the search statement; and perform one or more suspected incompatibilities resolution measures to resolve the incompatibilities.

In some cases, the suspected incompatibilities resolution measures include: providing a second user with the information enabling identification of the suspected incompatibilities; receiving, from the second user, a suspected incompatibilities resolution instruction for updating the index; updating the index in accordance with the suspected incompatibilities resolution instruction received from the second user.

In some cases, the suspected incompatibilities resolution measures includes automatically removing the mapping between the incompatible statements and the search frames.

In some cases, the search statement is part of a search sentence.

In some cases, the derivatives are determined by replacing one or more words of the given search statement with synonyms thereof.

In some cases, the synonyms are identified using WordNet.

In some cases, the frame is a pattern consisting of a syntactic description and one or more semantic predicates with a temporal function.

In some cases, the mapping of the statements to the frames is performed using a verb of the statement and using VerbNet.

In some cases, the frame represents a situation involving one or more participants, one or more props, and one or more conceptual roles.

In some cases, the mapping of the statements to the frames is performed using a verb of the statement and using FrameNet.

In some cases, the textual documents are of one or more of the following file types: (a) Portable Document Format (PDF); (b) Extensible Markup Language (XML); (c) Microsoft (MS) Word; and (d) Hypertext Markup Language (HTML).

In some cases, the index is language-agnostic, as a semantically-identical statement in a first language and in a second language will be mapped to a given frame of the frames.

In accordance with a third aspect of the presently disclosed subject matter, there is provided a semantic indexing method, the semantic indexing method comprising: providing, by a processing resource, a corpus comprising a plurality of textual documents, wherein (a) each of the textual documents being composed of one or more sentences; (b) each of the sentences being composed of one or more statements; and generating, by the processing resource, an index, the index mapping each of the statements to one or more frames; wherein each frame defines a structure that carries a semantic meaning, thereby enabling searching the corpus by the semantic meaning of a search statement.

In some cases, the method further comprises: receiving, by the processing resource, a given search statement; mapping, by the processing resource, at least one of: (a) the given search statement, and (b) one or more derivatives thereof, to one or more of the frames, giving rise to search frames; and generating, by the processing resource, using the index, a list of one or more of the textual documents comprising one or more of the statement that are mapped to at least one of the search frames.

In some cases, the given search statement is provided by a user and wherein the method further comprises providing the list to the user.

In some cases, the method further comprises: receiving, by the processing resource, from the user, information enabling identification of suspected incompatibilities between suspected incompatible statements of the statement within the textual documents within the list and the search statement; and performing, by the processing resource, one or more suspected incompatibilities resolution measures to resolve the incompatibilities.

In some cases, the suspected incompatibilities resolution measures include: providing a second user with the information enabling identification of the suspected incompatibilities; receiving, from the second user, a suspected incompatibilities resolution instruction for updating the index; updating the index in accordance with the suspected incompatibilities resolution instruction received from the second user.

In some cases, the suspected incompatibilities resolution measures includes automatically removing the mapping between the incompatible statements and the search frames.

In some cases, the search statement is part of a search sentence.

In some cases, the derivatives are determined by replacing one or more words of the given search statement with semantically-related replacement words.

In some cases, the semantically-related replacement words include synonyms, antonyms, hypernym, Hyponym, meronym, holonym, or troponym.

In some cases, the semantically-related replacement words are identified using WordNet.

In some cases, the frame is a pattern consisting of a syntactic description and one or more semantic predicates with a temporal function.

In some cases, mapping of the statement to the frames is performed using a verb of the statement and using VerbNet.

In some cases, the frame represents a situation involving one or more participants, one or more props, and one or more conceptual roles.

In some cases, mapping of the statements to the frames is performed using a verb of the statement and using FrameNet.

In some cases, the textual documents are of one or more of the following file types: (a) Portable Document Format (PDF); (b) Extensible Markup Language (XML); (c) Microsoft (MS) Word; and (d) Hypertext Markup Language (HTML).

In some cases, the method further comprises performing, by the processing resource, the following for each given statement of the statements, being mappable to a plurality of frames identified by a given mapping scheme: calculating a compatibility score indicative of the compatibility of each of the frames to the given statement; and selecting one or more of the frames, utilizing the compatibility score, giving rise to the frames that the given statement is mapped to.

In some cases, the compatibility score is determined by a correlation between statement elements of the given statement and frame elements of the frame.

In some cases, the statement elements and the frame elements are associated with respective element types and wherein the correlation weighted in accordance with a weight given to each of the element types.

In some cases, the mapping scheme is based on at least one of (a) VerbNet and (b) FrameNet.

In some cases, the index is language-agnostic, as a semantically-identical statement in a first language and in a second language will be mapped to a given frame of the frames.

In accordance with a fourth aspect of the presently disclosed subject matter, there is provided a semantic searching method, the semantic searching method comprising: providing, by a processing resource, an index, the index mapping a plurality of statements to one or more frames, wherein each frame defines a structure that carries a semantic meaning, thereby enabling searching the corpus by the semantic meaning of a search statement; receiving, by the processing resource, a given search statement; mapping, by the processing resource, at least one of: (a) the given search statement, and (b) one or more derivatives thereof, to one or more of the frames, giving rise search frames; and generating, by the processing resource, using the index, a list of one or more textual documents comprising one or more of the statements that are mapped by the index to at least one of the search frames.

In some cases, the given search statement is provided by a user and wherein the method further comprises providing the list to the user.

In some cases, the method further comprises: receiving, by the processing resource, from the user, information enabling identification of incompatible statements of the statements within the textual documents within the list as being incompatible with the search statement; and performing, by the processing resource, one or more suspected incompatibilities resolution measures to resolve the incompatibilities.

In some cases, the suspected incompatibilities resolution measures include: providing a second user with the information enabling identification of the suspected incompatibilities; receiving, from the second user, a suspected incompatibilities resolution instruction for updating the index; updating the index in accordance with the suspected incompatibilities resolution instruction received from the second user.

In some cases, the suspected incompatibilities resolution measures includes automatically removing the mapping between the incompatible statements and the search frames.

In some cases, the search statement is part of a search sentence.

In some cases, the derivatives are determined by replacing one or more words of the given search statement with synonyms thereof.

In some cases, the synonyms are identified using WordNet.

In some cases, the frame is a pattern consisting of a syntactic description and one or more semantic predicates with a temporal function.

In some cases, the mapping of the statements to the frames is performed using a verb of the statement and using VerbNet.

In some cases, the frame represents a situation involving one or more participants, one or more props, and one or more conceptual roles.

In some cases, the mapping of the statements to the frames is performed using a verb of the statement and using FrameNet.

In some cases, the textual documents are of one or more of the following file types: (a) Portable Document Format (PDF); (b) Extensible Markup Language (XML); (c) Microsoft (MS) Word; and (d) Hypertext Markup Language (HTML).

In some cases, the index is language-agnostic, as a semantically-identical statement in a first language and in a second language will be mapped to a given frame of the frames.

In accordance with a fifth aspect of the presently disclosed subject matter, there is provided a non-transitory computer readable storage medium having computer readable program code embodied therewith, the computer readable program code, executable by at least one processor of a computer to perform a method comprising: providing, by the at least one processor, a corpus comprising a plurality of textual documents, wherein (a) each of the textual documents being composed of one or more sentences; (b) each of the sentences being composed of one or more statements; and generating, by the at least one processor, an index, the index mapping each of the statements to one or more frames; wherein each frame defines a structure that carries a semantic meaning, thereby enabling searching the corpus by the semantic meaning of a search statement.

In accordance with a sixth aspect of the presently disclosed subject matter, there is provided a non-transitory computer readable storage medium having computer readable program code embodied therewith, the computer readable program code, executable by at least one processor of a computer to perform a method comprising: providing, by a processing resource, an index, the index mapping a plurality of statements to one or more frames, wherein each frame defines a structure that carries a semantic meaning, thereby enabling searching the corpus by the semantic meaning of a search statement; receiving, by the processing resource, a given search statement; mapping, by the processing resource, at least one of: (a) the given search statement, and (b) one or more derivatives thereof, to one or more of the frames, giving rise search frames; and generating, by the processing resource, using the index, a list of one or more textual documents comprising one or more of the statements that are mapped by the index to at least one of the search frames.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
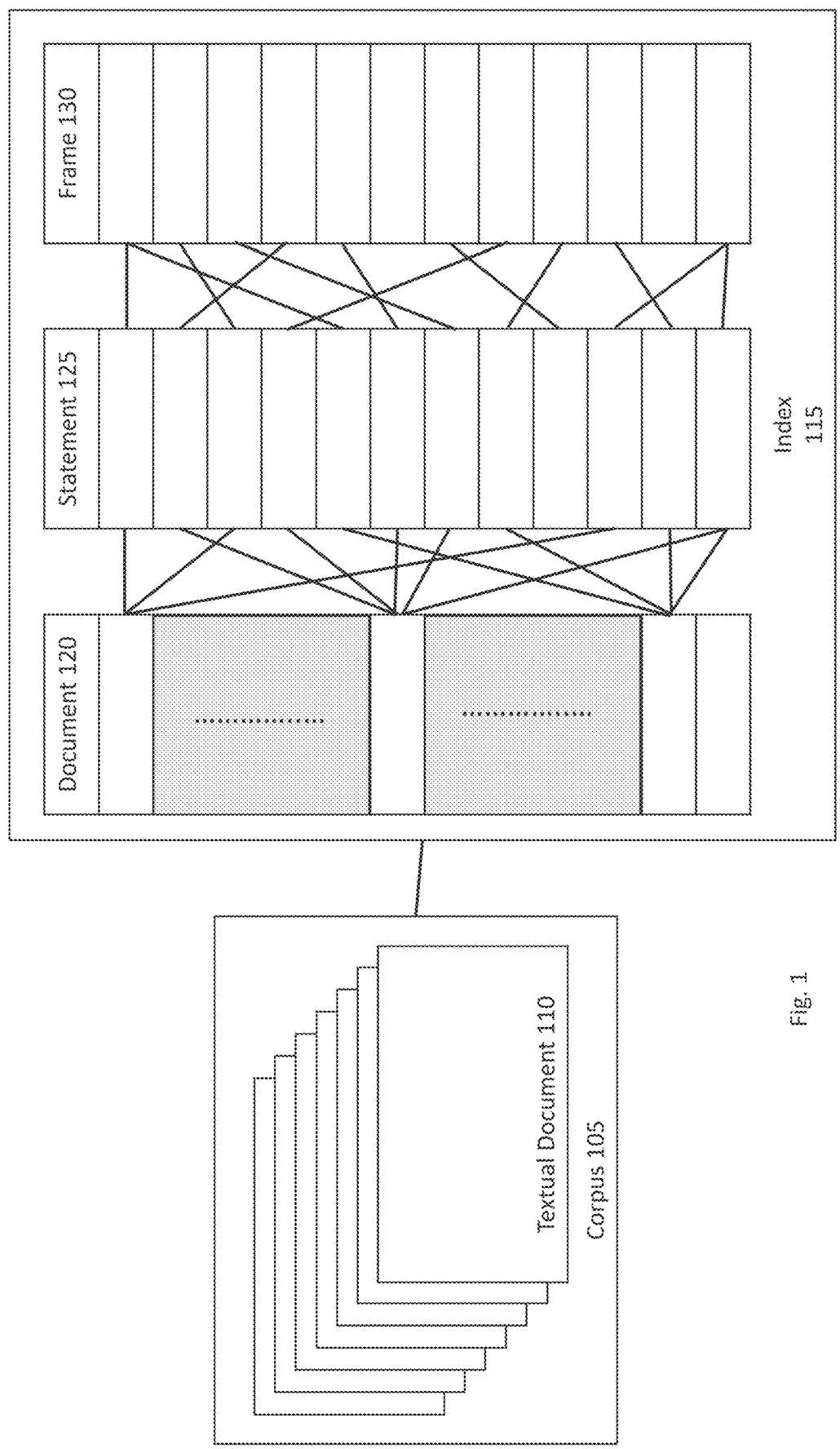
FIG. 1 is a schematic illustration of an index indexing a corpus of documents, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "generating", "receiving", "mapping", "performing", "updating", "calculating", "selecting" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
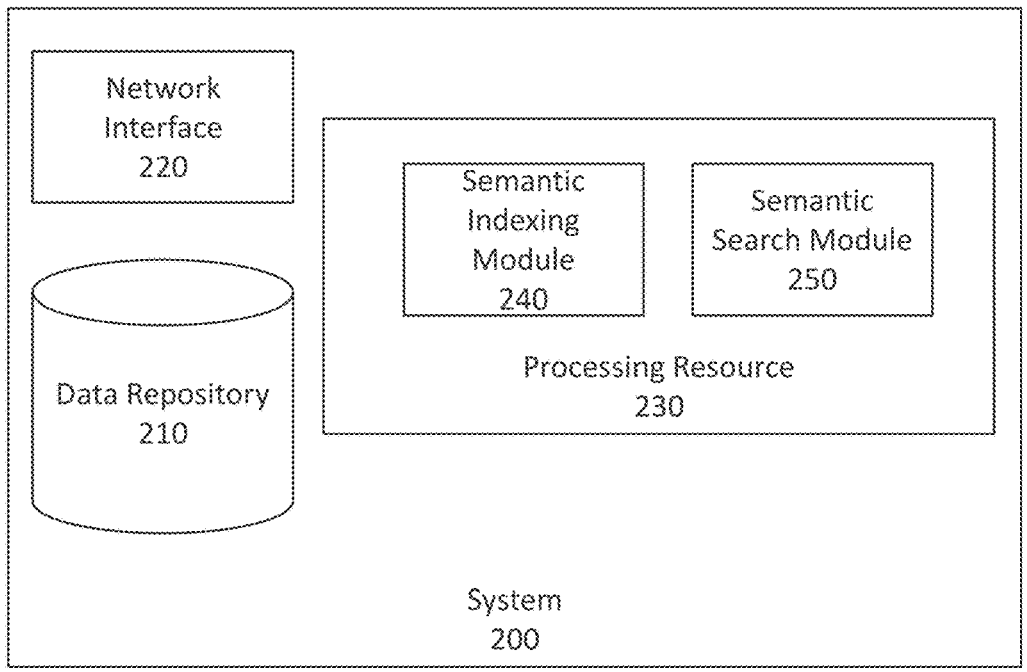
FIG. 2 is a block diagram schematically illustrating one example of a system for computerized semantic indexing and searching, in accordance with the presently disclosed subject matter.

In embodiments of the presently disclosed subject matter, fewer, more and/or different stages than those shown in FIGS. 3-7 may be executed. In embodiments of the presently disclosed subject matter one or more stages illustrated in FIG. 3-7 may be executed in a different order and/or one or more groups of stages may be executed simultaneously. FIGS. 1-2 illustrate a general schematic of the system architecture in accordance with an embodiment of the presently disclosed subject matter. Each module in FIGS. 1-2 can be made up of any combination of software, hardware and/or firmware that performs the functions as defined and explained herein. The modules in FIGS. 1-2 may be centralized in one location or dispersed over more than one location. In other embodiments of the presently disclosed subject matter, the system may comprise fewer, more, and/or different modules than those shown in FIGS. 1-2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of an index indexing a corpus of documents, in accordance with the presently disclosed subject matter.

According to certain examples of the presently disclosed subject matter, a corpus 105 of textual objects, such as textual documents 110, is provided. Textual documents can be, for example, one or more files of the following file types: Portable Document Format (PDF), Extensible Markup Language (XML), Microsoft (MS) Word, Hypertext Markup Language (HTML). It is to be noted that throughout this description reference is made to textual documents 110, however, this is by no means binding and the textual document can be replaced by any other textual object, including websites, webpages, etc.

Each of the textual documents 110 is composed of one or more sentences, and each of the sentences is composed of one or more statements. A statement is a part of a sentence that has a semantical meaning. For example, the sentence "John is very happy, he won a prize", comprises two statements: "John is very happy" and "he won a prize". As another example, the sentence "Jane went to school, but school was closed" comprises two statements: "Jane went to school" and "school was closed".

The corpus 105 is indexed according to the presently disclosed subject matter, into an index 115. The index 115 is a data structure mapping each of the textual documents 110 (according to unique document identifiers 120 thereof) to its statements (according to unique statement identifiers 125 thereof), and each of the statements (according to unique statement identifiers 125 thereof) to one or more corresponding frames (according to unique frame identifiers 130 thereof), and vice versa.

In some cases, a frame can be a pattern consisting of a syntactic description and one or more semantic predicates with a temporal function. One example of such framing scheme for defining frames is VerbNet (VN) (Kipper-Schuler 2006) (available at: http://verbs.colorado.edu/verb-index/vn3.3/index.php).

In other cases, a frame can represent a situation involving one or more participants, one or more props, and one or more conceptual roles. One example of such framing scheme for defining frames is FrameNet, a project housed at the International Computer Science Institute in Berkeley, Calif., and based on work of Charles J. Fillmore (available at: https://framenet.icsi.berkeley.edu/fndrupal/).

The index 115 can be used by a semantic search engine. For example, a given search statement can be provided by a user as input, following which one or more frames associated with the search statement can be identified, using a mapping scheme such as the above mentioned FrameNet or VerbNet. Then, the index 115 can be used to identify statements (according to unique statement identifiers 125 thereof) within the index 115 that are mapped to the identified frames (according to unique frame identifiers 130 thereof), and to identify documents (according to unique document identifiers 120 thereof) within the index that are mapped to the identified statements. The identified documents, or information enabling identification thereof, can then be provided to the user as output. A more detailed explanation about the generation of the index 115 and utilization thereof for searching for textual documents 110 that semantically relate to a given search statement, is provided herein.

Turning to FIG. 2, there is shown a block diagram schematically illustrating one example of a system for computerized semantic indexing and searching, in accordance with the presently disclosed subject matter.

According to certain examples of the presently disclosed subject matter, system 200 can comprise a network interface 220 enabling sending/receiving data, including receiving search statements associated with a requested semantic search, and sending responses thereto including results of a semantic search.

System 200 can further comprise, or be otherwise associated with, a data repository 210 (e.g. a database, a storage system, a memory including Read Only Memory—ROM, Random Access Memory—RAM, or any other type of memory, etc.) configured to store data, including inter alia the textual documents 110 within the corpus 105, and/or the index 115. Data repository 210 can be further configured to enable retrieval and/or update and/or deletion of the stored data. It is to be noted that in some cases, data repository 210 can be distributed, while the system 200 has access to the information stored thereon, including at least the index 115.

System 200 further comprises one or more processing resources 230. Processing resource 230 can be one or more processing units (e.g. central processing units), microprocessors, microcontrollers or any other computing devices or modules, including multiple and/or parallel and/or distributed processing units, which are adapted to independently or cooperatively process data for controlling relevant system 200 resources and for enabling operations related to system 200 resources.

The processing resource 230 can comprise one or more of the following modules: semantic indexing module 240, and semantic search module 250.

According to some examples of the presently disclosed subject matter, semantic indexing module 240 can be configured to perform a semantic indexing process, as further detailed herein, inter alia with respect to FIGS. 3-6.

Figure 3:
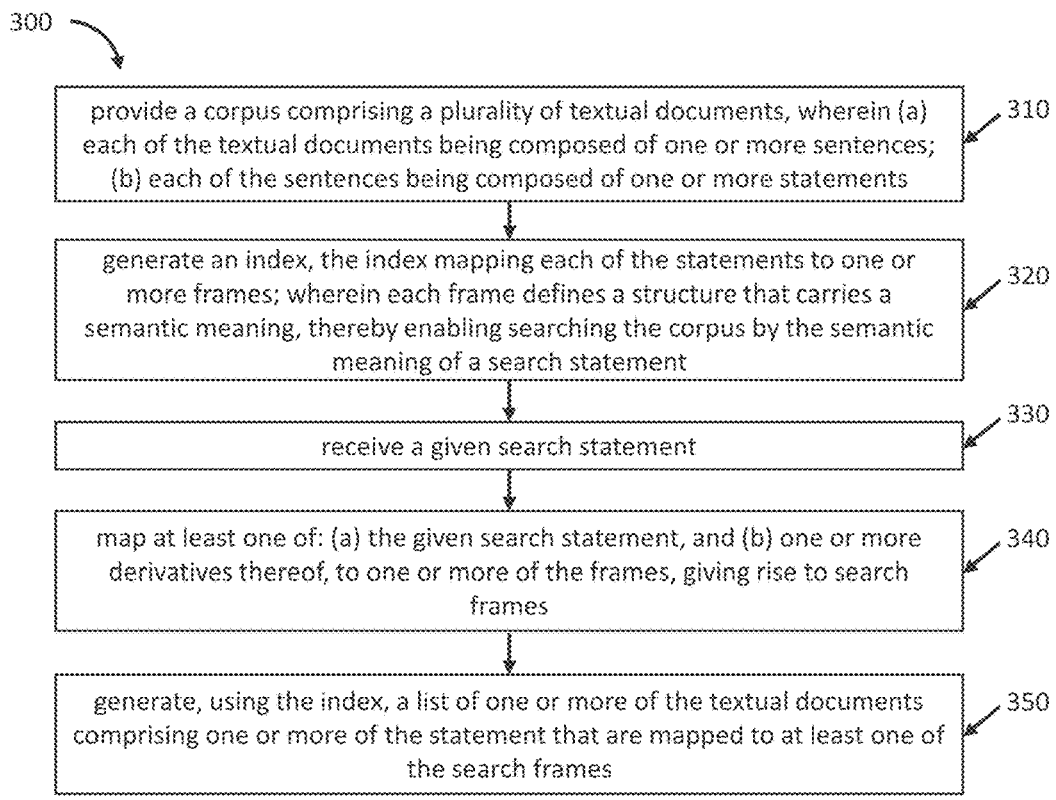
FIG. 3 is a flowchart illustrating one example of a sequence of operations carried out for generating an index, in accordance with the presently disclosed subject matter.
Figure 7:
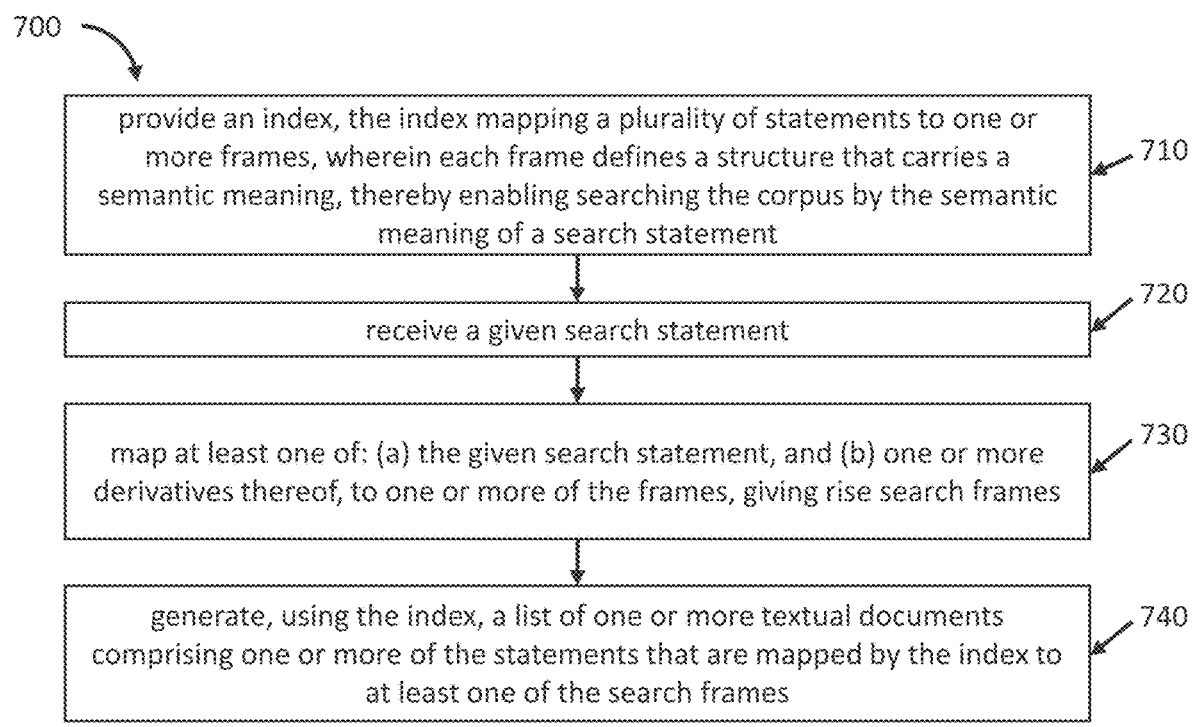
FIG. 7 is a flowchart illustrating one example of a sequence of operations carried out for mapping frames to a statement, in accordance with the presently disclosed subject matter.

According to some examples of the presently disclosed subject matter, semantic search module 240 can be configured to perform a semantic search process, as further detailed herein, inter alia with respect to FIGS. 3 and 7.

Attention is drawn to FIG. 3, a flowchart illustrating one example of a sequence of operations carried out for generating an index, in accordance with the presently disclosed subject matter.

According to certain examples of the presently disclosed subject matter, system 200 can be configured to perform a semantic indexing process 300, e.g. utilizing semantic indexing module 240.

For this purpose, system 200 can be configured to provide a corpus 105 comprising a plurality of textual documents 110, wherein each of the textual documents 100 is composed of one or more sentences and each of the sentences are composed of one or more statements (block 310).

System 200 is further configured to analyze the corpus 105 in order to generate an index 115, mapping each of the statements within each of the textual documents 110 of the corpus 105 to one or more frames (block 320). Each frame defines a structure that carries a semantic meaning. The generated index 115 can be utilized for searching the corpus 105 by the semantic meaning of a given search statement, as further detailed herein.

One exemplary mapping scheme can define a frame as a pattern consisting of a syntactic description and one or more semantic predicates with a temporal function. In such cases, mapping of the statement to the frames can be performed using a verb of the statement and using VerbNet, e.g. utilizing known methods and/or techniques. Another exemplary mapping scheme can define a frame as a representation of a situation involving one or more participants, one or more props, and one or more conceptual roles. In such cases, mapping of the statements to the frames can be performed using a verb of the statement and using FrameNet, e.g. utilizing known methods and/or techniques.

It is to be noted that the index 115 is language-agnostic, as a semantically-identical statement in a first language and in a second language will be mapped to the same frame/s.

In some cases, a given statement can be mappable, in accordance with any of the above mapping schemes, to a plurality of frames. In such cases, an optional mapping selection process 600 can be performed, as further detailed with reference to FIG. 6, in order to select a sub-group of the frames to which the given statement will be mapped.

Figure 4:
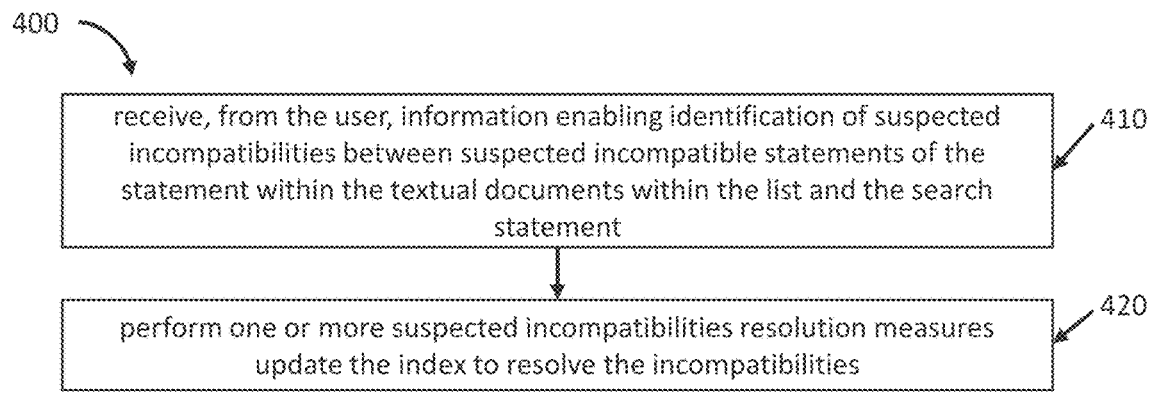
FIG. 4 is a flowchart illustrating one example of a sequence of operations carried out for performing a semantic search using an index, in accordance with the presently disclosed subject matter.

After generating the index 115, the system 200 can optionally be configured to perform a semantic search process, utilizing the index 115. For this purpose, attention is drawn to FIG. 4, showing a flowchart illustrating one example of a sequence of operations carried out for semantic searching using an index, in accordance with the presently disclosed subject matter.

According to certain examples of the presently disclosed subject matter, system 200 can be configured to perform a semantic search process 400, e.g. utilizing semantic search module 250.

For this purpose, system 200 can be configured to provide the index 115, mapping a plurality of statements to one or more frames, wherein each frame defines a structure that carries a semantic meaning, thereby enabling searching the corpus 105 by the semantic meaning of a search statement (block 410). The index 115 can optionally be generated in accordance with the semantic indexing process 300 detailed above, however, in some cases, it can be generated in other manners, as long as it provides the mapping between statements and frames as detailed with respect to FIG. 3.

System 200 is further configured to receive a search statement, having a semantical meaning (block 420). The search statement can be provided as input, from a user (directly, or via an external system), or from another computerized system that optionally automatically generates the search statement. In some cases, the search statement can be a part of a larger search sentence, that can optionally be split to the search statement and to at least one additional search statement. In such cases, each split part of the search sentence can be searched by the system 200, as further detailed herein.

System 200 maps at least one of: (a) the given search statement, and (b) one or more derivatives thereof, to one or more of the frames, giving rise to search frames (block 430). The mapping can be performed using the VerbNet mapping scheme, the FrameNet scheme, or any other scheme that maps statements having a semantic meaning to one or more corresponding frames.

The derivatives, if used, can be determined, for example, by replacing one or more words of the given search statement with semantically-related replacement words. The semantically-related replacement words can include, for example, synonyms, antonyms, hypernym, Hyponym, meronym, holonym, or troponym. In some cases, the semantically-related replacement words can be identified using WordNet (George A. Miller (1995), WordNet: A Lexical Database for English, Communications of the ACM Vol. 38, No. 11: 39-41; Christiane Fellbaum (1998, ed.) WordNet: An Electronic Lexical Database, Cambridge, Mass.: MIT Press.; available at: https://wordnet.princeton.edu/).

System 200 then generates, using the index 115, a list of one or more of the textual documents 110 comprising one or more of the statement that are mapped to at least one of the search frames (block 440).

as indicated herein, the given search statement can optionally be provided by a user and in such cases, the system 200 can be further configured to provide the list generated at block 440 to the user as output.

Figure 5:
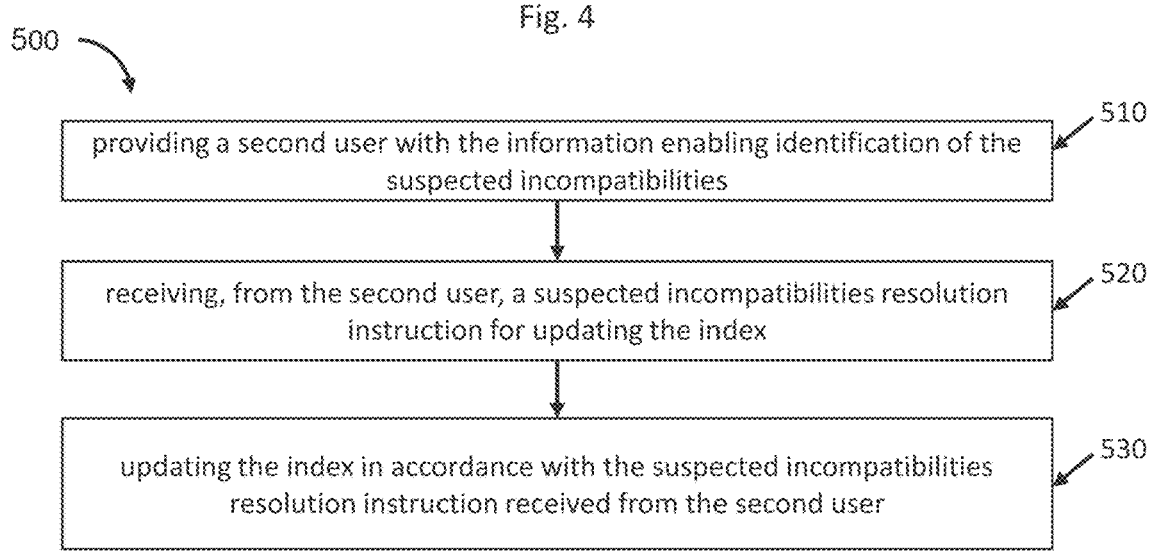
FIG. 5 is a flowchart illustrating one example of a sequence of operations carried out for resolving incompatibilities, in accordance with the presently disclosed subject matter.
Figure 6:
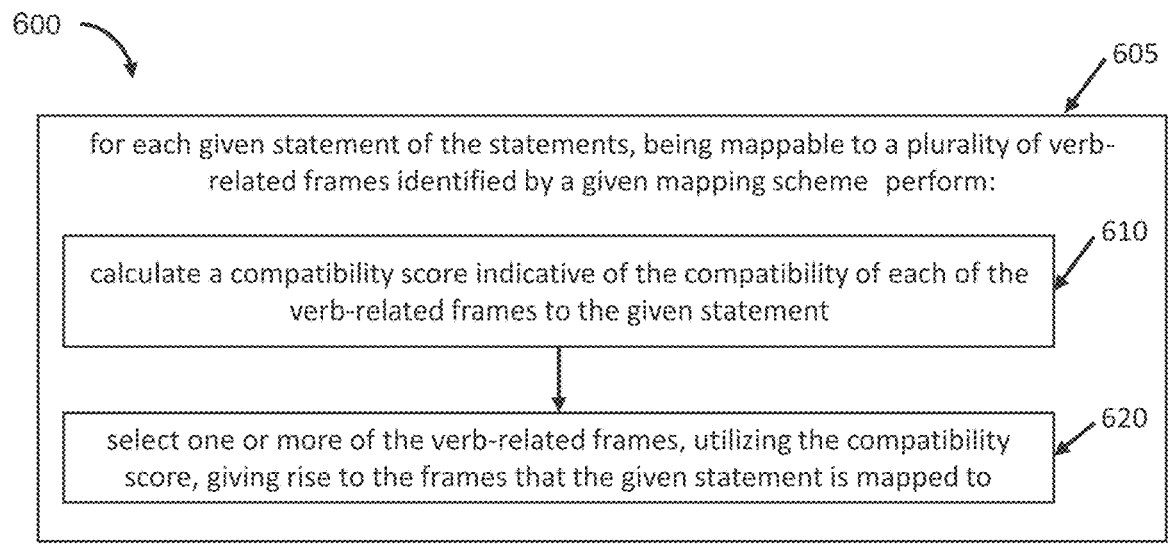
FIG. 6 is a flowchart illustrating one example of a sequence of operations carried out for updating the index, with a human aid, for resolving incompatibilities, in accordance with the presently disclosed subject matter.

Turning to FIG. 5, there is shown a flowchart illustrating one example of a sequence of operations carried out for resolving incompatibilities, in accordance with the presently disclosed subject matter.

According to certain examples of the presently disclosed subject matter, system 200 can be configured to perform an incompatibilities resolution process 500, e.g. utilizing semantic indexing module 240.

For this purpose, system 200 can be configured to receive (e.g. from a user to which the list, generated at block 440 is provided, or from any other source, including from another computerized system), information enabling identification of suspected incompatibilities between one or more statements within the textual documents within the list generated at block 440 (referred to herein as "suspected incompatible statements") and a given search statement (block 510). The information enabling identification of incompatibilities can include, for example, unique statement identifiers 125 of the suspected incompatible statements.

It is to be noted that incompatibilities can exist in a semantic search for example due to the fact that the search engine attempts to "understand" the meaning of the search statement, and in some cases, such "understanding" may be erroneous. Therefore, it is desirable to provide a mechanism to resolve such incompatibilities.

In some cases, a human user that receives the search results can analyze them and identify the incompatibilities and provide appropriate indications to the system 200, while in other cases, the incompatibilities can be identified by another computerized system that can attempt to validate the results of the search and identify the incompatibilities automatically.

Upon identification of an incompatibility, system 200 can be configured to perform one or more suspected incompatibilities resolution measures to resolve the incompatibilities (block 520).

In some cases, the suspected incompatibilities resolution measures can include automatically updating the index 115. The index 115 can be updated, for example, by deleting the mapping between the suspected incompatible statements and the search frames.

As an alternative, the system 200 can be configured to perform a human-aided incompatibilities resolution process. In this respect, attention is drawn to FIG. 6, a flowchart illustrating one example of a sequence of operations carried out for updating the index, with a human aid, for resolving incompatibilities, in accordance with the presently disclosed subject matter.

According to certain examples of the presently disclosed subject matter, system 200 can be configured to perform a human-aided incompatibilities resolution process 600, e.g. utilizing semantic indexing module 240.

For this purpose, system 200 can be configured to provide a second user (optionally a user other than the user that identified the suspected incompatibilities), such as a linguistic specialist, or any other person authorized to update the index 115, with the information enabling identification of the suspected incompatibilities received at block 510 (block 610).

The second user than provides the system 200 with a suspected incompatibilities resolution instruction for updating the index 115 (block 620), and the system 200 updates the index 115 in accordance with the suspected incompatibilities resolution instruction received from the second user (block 630).

The suspected incompatibilities resolution instruction can be an instruction to delete the mapping between the suspected incompatible statements and the search frames. Additionally, or alternatively, the suspected incompatibilities resolution instruction can be an instruction to remap the suspected incompatible statements to other frames within the index 115. Additionally, or alternatively, the suspected incompatibilities resolution instruction can be an instruction to change one or more rules according to which the suspected incompatible statements were initially mapped to one or more of the search frames.

Turning to FIG. 7 there is shown a flowchart illustrating one example of a sequence of operations carried out for mapping frames to a statement, in accordance with the presently disclosed subject matter.

According to certain examples of the presently disclosed subject matter, system 200 can be configured to perform a mapping process 700, e.g. utilizing semantic indexing module 240. In situations where a given statement is mappable to a plurality of frames in accordance with a mapping scheme, the mapping process 700 can enable selective mapping, within the index 115, of the given statement to a subgroup of the frames to which the given search frame is mappable.

For this purpose, system 200 can be configured to perform the following for each given statement of the statements within the textual documents 110 that are mappable, in accordance with a mapping scheme utilized for generating the index 115 at block 320, to a plurality of frames (block 705):

calculate a compatibility score indicative of the compatibility of each of the frames to the given statement (block 710) and select one or more of the frames, utilizing the compatibility score, giving rise to the frames that the given statement is mapped to (block 720).

In some cases, the compatibility score can be determined by a correlation between statement elements (e.g. words) of the given statement and frame elements (e.g. words) of the frame.

In more specific cases, the statement elements and the frame elements can be associated with respective element types (e.g. verbs, nouns, adjectives, pronouns, adverbs, prepositions, conjunctions, interjections, etc.), and in such cases, the correlation can be weighted in accordance with a weight given to each of the element types.

It is to be noted that, with reference to FIGS. 3-7, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A semantic indexing system, the semantic indexing system comprising a processing device configured to:
provide a corpus comprising a plurality of textual documents, wherein (a) each of the textual documents being composed of one or more sentences; (b) each of the sentences being composed of one or more statements; and
generate an index, the index mapping each of the statements to one or more corresponding frames of a plurality of unique frames;
wherein: (a) each frame of the plurality of unique frames is a pattern consisting of a syntactic description and one or more semantic predicates with a temporal function, and mapping each of the statements to the corresponding frames is performed using a verb of the corresponding statement and using VerbNet, or (b) each frame of the plurality of unique frames represents a situation involving one or more participants, one or more props, and one or more conceptual roles, and mapping each of the statements to the corresponding frames is performed using the verb of the corresponding statement and using FrameNet; and wherein each frame of the plurality of unique frames defines a structure that carries a semantic meaning, thereby enabling searching the corpus by a semantic meaning of a search statement.

2. The semantic indexing system of claim 1, wherein the processing device is further configured to:

receive a given search statement;

map at least one of: (a) the given search statement, and (b) one or more derivatives thereof, to one or more of the plurality of unique frames, giving rise to search frames; and generate, using the index, a list of one or more of the textual documents comprising one or more selected statements of the statements, wherein the selected statements are mapped to at least one of the search frames.

3. The semantic indexing system of claim 2, wherein the given search statement is provided by a user and wherein the processing device is further configured to:

provide the list to the user;

receive, from the user, information enabling identification of suspected incompatibilities between (a) suspected incompatible statements of the selected statements within the textual documents within the list and (b) the given search statement; and perform one or more suspected incompatibilities resolution measures to resolve the suspected incompatibilities.

4. The semantic indexing system of claim 3, wherein a given suspected incompatibilities resolution measure of the suspected incompatibilities resolution measures includes:

providing a second user with the information enabling identification of the suspected incompatibilities;

receiving, from the second user, a suspected incompatibilities resolution instruction for updating the index; and updating the index in accordance with the suspected incompatibilities resolution instruction received from the second user.

5. The semantic indexing system of claim 3, wherein a given suspected incompatibilities resolution measure of the suspected incompatibilities resolution measures includes automatically removing the mapping between the suspected incompatible statements and the search frames.

6. The semantic indexing system of claim 2, wherein the one or more derivatives are determined by replacing one or more words of the given search statement with semantically-related replacement words.

7. The semantic indexing system of claim 1, wherein the processing device is further configured to perform the following for each of the statements that are mappable to a plurality of given frames identified by a given mapping scheme:

calculate a compatibility score indicative of a compatibility of each of the given frames to the respective statement; and select one or more of the given frames, utilizing the compatibility score, giving rise to mapped given frames, being the given frames that the respective statement is mapped to.

8. The semantic indexing system of claim 7, wherein the compatibility score is determined by a correlation between statement elements of the respective statement and frame elements of the respective given frame.

9. The semantic indexing system of claim 8, wherein the statement elements and the frame elements are associated with respective element types and wherein the correlation is weighted in accordance with a weight given to each of the element types.

10. The semantic indexing system of claim 7, wherein the given mapping scheme is based on at least one of (a) VerbNet and (b) FrameNet.

11. A semantic indexing method, the semantic indexing method comprising:

providing, by a processing resource, a corpus comprising a plurality of textual documents, wherein (a) each of the textual documents being composed of one or more sentences; (b) each of the sentences being composed of one or more statements; and generating, by the processing resource, an index, the index mapping each of the statements to one or more corresponding frames of a plurality of unique frames;

wherein: (a) each frame of the plurality of unique frames is a pattern consisting of a syntactic description and one or more semantic predicates with a temporal function, and mapping each of the statements to the corresponding frames is performed using a verb of the corresponding statement and using VerbNet, or (b) each frame of the plurality of unique frames represents a situation involving one or more participants, one or more props, and one or more conceptual roles, and mapping each of the statements to the corresponding frames is performed using the verb of the corresponding statement and using FrameNet; and wherein each frame of the plurality of unique frames defines a structure that carries a semantic meaning, thereby enabling searching the corpus by a semantic meaning of a search statement.

12. The semantic indexing method of claim 11, further comprising:

receiving, by the processing resource, a given search statement;

mapping, by the processing resource, at least one of: (a) the given search statement, and (b) one or more derivatives thereof, to one or more of the plurality of unique frames, giving rise to search frames; and generating, by the processing resource, using the index, a list of one or more of the textual documents comprising one or more selected statements of the statements, wherein the selected statements are mapped to at least one of the search frames.

13. The semantic indexing method of claim 12, wherein the given search statement is provided by a user and wherein the method further comprises:

providing the list to the user;

receiving, by the processing resource, from the user, information enabling identification of suspected incompatibilities between (a) suspected incompatible statements of the selected statements within the textual documents within the list and (b) the given search statement; and performing, by the processing resource, one or more suspected incompatibilities resolution measures to resolve the suspected incompatibilities.

14. The semantic indexing method of claim 13, wherein a given suspected incompatibilities resolution measure of the suspected incompatibilities resolution measures includes:
  providing a second user with the information enabling identification of the suspected incompatibilities;
  receiving, from the second user, a suspected incompatibilities resolution instruction for updating the index; and
  updating the index in accordance with the suspected incompatibilities resolution instruction received from the second user.

15. The semantic indexing method of claim 13, wherein a given suspected incompatibilities resolution measure of the suspected incompatibilities resolution measures includes automatically removing the mapping between the suspected incompatible statements and the search frames.

16. The semantic indexing method of claim 12, wherein the one or more derivatives are determined by replacing one or more words of the given search statement with semantically-related replacement words.

17. The semantic indexing method of claim 11, further comprising performing, by the processing resource, the following for each of the statements that are mappable to a plurality of given frames identified by a given mapping scheme:
  calculating a compatibility score indicative of a compatibility of each of the given frames to the respective statement; and
  selecting one or more of the given frames, utilizing the compatibility score, giving rise to mapped given frames, being the given frames that the respective statement is mapped to.

18. The semantic indexing method of claim 17, wherein the compatibility score is determined by a correlation between statement elements of the respective statement and frame elements of the respective given frame.

19. The semantic indexing method of claim 17, wherein the given mapping scheme is based on at least one of (a) VerbNet and (b) FrameNet.

20. A non-transitory computer readable storage medium having computer readable program code embodied therewith, the computer readable program code, executable by at least one processor of a computer to perform a method comprising:
  providing, by the at least one processor, a corpus comprising a plurality of textual documents, wherein (a) each of the textual documents being composed of one or more sentences; (b) each of the sentences being composed of one or more statements; and
  generating, by the at least one processor, an index, the index mapping each of the statements to one or more corresponding frames of a plurality of unique frames;
  wherein: (a) each frame of the plurality of unique frames is a pattern consisting of a syntactic description and one or more semantic predicates with a temporal function, and mapping each of the statements to the corresponding frames is performed using a verb of the corresponding statement and using VerbNet, or (b) each frame of the plurality of unique frames represents a situation involving one or more participants, one or more props, and one or more conceptual roles, and mapping each of the statements to the corresponding frames is performed using the verb of the corresponding statement and using FrameNet; and
  wherein each frame of the plurality of unique frames defines a structure that carries a semantic meaning, thereby enabling searching the corpus by a semantic meaning of a search statement.

* * * * *